United States Patent
Harada

(10) Patent No.: US 8,659,288 B2
(45) Date of Patent: Feb. 25, 2014

(54) ROTATION ANGLE DETECTOR

(75) Inventor: Tomoyuki Harada, Nagoya (JP)

(73) Assignee: DENSO CORPORATION, Kariya (JP)

( * ) Notice: Subject to any disclaimer, the term of this patent is extended or adjusted under 35 U.S.C. 154(b) by 432 days.

(21) Appl. No.: 13/165,835

(22) Filed: Jun. 22, 2011

(65) Prior Publication Data

US 2012/0025811 A1 Feb. 2, 2012

(30) Foreign Application Priority Data

Jul. 29, 2010 (JP) ................................. 2010-170898

(51) Int. Cl.
*G01B 7/30* (2006.01)

(52) U.S. Cl.
USPC ............ 324/207.25; 324/207.24; 324/207.13; 324/207.21

(58) Field of Classification Search
USPC ............. 324/207.11, 207.13, 207.15, 207.16, 324/207.21, 207.23, 207.24, 207.25, 228, 324/244.1, 96
See application file for complete search history.

(56) References Cited

U.S. PATENT DOCUMENTS

| | | | |
|---|---|---|---|
| 2007/0069719 A1 | 3/2007 | Hatanaka et al. | |
| 2009/0206827 A1* | 8/2009 | Aimuta et al. | 324/207.25 |
| 2010/0007341 A1* | 1/2010 | Tanaka et al. | 324/207.25 |
| 2010/0225309 A1* | 9/2010 | Takahashi et al. | 324/207.25 |

FOREIGN PATENT DOCUMENTS

| | | |
|---|---|---|
| JP | A-06-34645 | 2/1994 |
| JP | A-2007-201362 | 7/2001 |
| JP | A-2004-61355 | 2/2004 |

OTHER PUBLICATIONS

Office Action dated Aug. 21, 2013 in corresponding Chinese Application No. 2011 1022 0287.5 (and English translation).

* cited by examiner

*Primary Examiner* — Arleen M Vazquez
*Assistant Examiner* — Son Le
(74) *Attorney, Agent, or Firm* — Posz Law Group, PLC

(57) ABSTRACT

A rotation angle detector for detecting a rotation angle of a magnet rotator includes: the rotator with a magnet mounted on a rotation shaft; a sensor chip; and an operation element. The chip includes: first and second normal component detection elements for detecting a magnetic field along with a normal direction and first and second rotation component detection elements for detecting a magnetic field along with a rotation direction. A phase difference $\Delta\theta$, output signals $S_1$, $S_2$, $C_1$, $C_2$ of the detection elements, a value $\Delta_\theta b_R$ obtained by differentiating a component of the magnetic field along with the normal direction with respect to the rotation direction, and a value $\Delta_\theta b_\theta$ obtained by differentiating a component of the magnetic field along with the rotation direction with respect to the rotation direction satisfies:

$$\frac{S_1 - S_2}{\Delta\theta} \cong \Delta_\theta b_R$$

and $$\frac{C_1 - C_2}{\Delta\theta} \cong \Delta_\theta b_\theta$$

The operation element calculates:

$$C_1 + \alpha \frac{S_1 - S_2}{\Delta\theta}$$

and $$S_1 - \beta \frac{C_1 - C_2}{\Delta\theta}.$$

18 Claims, 2 Drawing Sheets

ROTATION ANGLE DETECTOR

CROSS REFERENCE TO RELATED APPLICATION

This application is based on Japanese Patent Application No. 2010-170898 filed on Jul. 29, 2010, the disclosure of which is incorporated herein by reference.

TECHNICAL FIELD

The present invention relates to a rotation angle detector including a magnet rotator having a pair of magnetic poles and a sensor chip with a magnetic field detection element on a semiconductor substrate.

BACKGROUND

Conventionally, as described in Japanese Patent No. 4273363 corresponding to US-2009/0206827, a rotation angle detector includes a magnet rotator having four or more magnetic poles (i.e., two ore more pairs of magnetic poles), and first and second sensing devices for detecting a direction of magnetic flux generated by the magnet rotator.

Each of the first and second sensing devices is a spin-valve type giant magneto-resistance effect element having a fixed layer and a variable layer. A magnetization direction of the fixed layer is fixed to a certain direction. A magnetization direction of the variable layer is varied with a direction of a magnetic field. The giant magneto-resistance effect element has a property such that a resistance of the element is changed according to an angle between the magnetization direction of the fixed layer and the magnetization direction (i.e., the magnetic field direction) of the variable layer. When the magnet rotator rotates by an electric angle (which is an angle calculated by dividing the rotation angle with the number of pairs of the magnetic poles), the sensing device having the resistor element outputs a signal corresponding to one period of a waveform. For example, when the magnet rotator includes two pairs of magnetic poles, and the magnet rotator rotates one revolution, the sensing device outputs the signal corresponding to two periods of the waveform.

A rotation angle detector described in Japanese Patent No. 4273363 will be explained. The first sensing device includes two sensing bridges X01, Y01, each of which provides a full bridge composed of four resistor elements. The second sensing device includes two sensing bridges X02, Y02, each of which provides a full bridge composed of four resistor elements. The full bridge includes a pair of resistor elements coupled in series with each other and another pair of resistor elements coupled in series with each other. The pair of resistor elements and the other pair of resistor elements are coupled in parallel to each other between a power source and a ground. Thus, each full bridge (i.e., each sensing bridge X01, X02, Y01, Y02) is prepared. The magnetization direction of the fixed layer in the resistor element on a power source side of one pair of the resistor elements is opposite to the magnetization direction of the fixed layer in the resistor element on a power source side of the other pair of the resistor elements. The magnetization direction of the fixed layer in the resistor element on a ground side of the one pair of the resistor elements is opposite to the magnetization direction of the fixed layer in the resistor element on a ground side of the other pair of the resistor elements.

The magnetization direction of the fixed layer in the resistor elements of the sensing bridge Y01 is in parallel to a rotation direction of the magnet rotator. Further, the magnetization direction of the fixed layer in the resistor elements of the sensing bridge Y01 is perpendicular to the magnetization direction of the fixed layer in the resistor elements of the sensing bridge X01. The magnetization direction of the fixed layer in the resistor elements of the sensing bridge Y02 is in parallel to a rotation direction of the magnet rotator. Further, the magnetization direction of the fixed layer in the resistor elements of the sensing bridge Y02 is perpendicular to the magnetization direction of the fixed layer in the resistor elements of the sensing bridge X02. The magnetization direction of the fixed layer in the resistor elements of the sensing bridge X01 and the magnetization direction of the fixed layer in the resistor elements of the sensing bridge X02 are arranged to differentiate a phase by the electric angle of 90 degrees.

The first sensing device has a magnetic field sensitive direction as a reference of the magnet rotator. The rotation angle of the first sensing device with respect to the magnet rotator is defined as θ. When the sensing bridge X01 outputs the detection signal depending on a term of cos θ, the sensing bridge Y01 outputs the detection signal depending on a term of −sin θ since the magnetization direction of the fixed layer in the resistor elements of the sensing bridge Y01 is perpendicular to the magnetization direction of the fixed layer in the resistor elements of the sensing bridge X01.

Since the magnetization direction of the fixed layer in the resistor elements of the sensing bridge X01 and the magnetization direction of the fixed layer in the resistor elements of the sensing bridge X02 are arranged to differentiate the phase by the electric angle of 90 degrees, the sensing bridge X02 outputs the detection signal depending on a term of sin θ. Since the magnetization direction of the fixed layer in the resistor elements of the sensing bridge Y02 is perpendicular to the magnetization direction of the fixed layer in the resistor elements of the sensing bridge X02, the sensing bridge Y02 outputs the detection signal depending on a term of cos θ.

The factors depending on the term of θ in the detection signals of the sensing bridges X01, Y01 are defined as (X01θ, Y01θ). (X01θ, Y01θ) is equal to (cos θ, −sin θ). The factors depending on the term of θ in the detection signals of the sensing bridges X02, Y02 are defined as (X02θ, Y02θ). (X02θ, Y02θ) is equal to (sin θ, cos θ). Thus, the detection signals of the sensing bridges X01, Y02 depend on the term of cos θ. The detection signals of the sensing bridges Y01, X02 depend on the term of sin θ. Accordingly, the detection signal of the sensing bridge Y02 is reversed so that the reversed detection signal is obtained, and the factor depending on the term of θ in the reversed detection signal of the sensing bridge Y02 is defined as Y02θ'. When an operation amplifier calculates a difference of (X01θ−Y02θ') and a difference of (X02θ−Y01θ), the value of cos θ and the value of sin θ in each detection signal are obtained. Here, a high frequency noise having the same phase is canceled in value of cos θ and the value of sin θ. Based on the value of cos θ and the value of sin θ, the value of tan θ is calculated. Then, an angle calculator executes a calculation with using an arctangent function so that the angle θ is calculated.

Here, the first sensing device is formed in a chip, which is different from the second sensing device. In this case, the rotation angle detector includes multiple chips, so that a manufacturing cost of the detector is high.

To improve the manufacturing cost, the first and second sensing devices may be formed in one chip. However, in this case, when the high frequency noise is removed from the detection signal, as described above, since the magnetization direction of the fixed layer in the resistor elements of the sensing bridge X01 and the magnetization direction of the fixed layer in the resistor elements of the sensing bridge X02 are arranged to differentiate a phase by the electric angle of 90 degrees, the electric angle increases in a case where the number of magnetic poles of the magnet rotator is small, and the dimensions of the chip increases. Here, when the number of magnetic poles of the magnet rotator is large, the electric angle is reduced, and therefore, the dimensions of the chip are limited. However, when the number of magnetic poles of the magnet rotator is large, the rotation frequency of the rotation magnetic field increases. Thus, a processing speed of the angle calculator with respect to the input signal may not be sufficient.

The magnet rotator together with the magnet is attached to and fixed to a rotation shaft. The rotation shaft is rotated by a magnetic flux, which is generated by windings. The windings surround the magnet rotator. In this case, the chip is arranged between the windings and the magnet rotator. The magnetic flux of the windings and the magnetic flux of the magnet rotator are applied to the chip. In order to detect the rotation angle of the magnet rotator based on the magnetic flux of the magnet rotator, it is necessary to remove the magnetic flux of the windings. Thus, the magnetic flux generated by the windings provides a noise, which is defined as an inductive noise.

The rotation shaft is rotated by a repulsion force between the inductive noise and the magnetic flux generated by the magnet fixed to the rotation shaft. Accordingly, the rotation direction of the inductive noise is opposite to the rotation direction of the rotation magnetic field of the magnet rotator. When the inductive noise is removed by a noise reduction method described in Japanese Patent No. 4273363, it is necessary to arrange the magnetization direction of the fixed layer in the resistor elements of the sensing bridge X01 and the magnetization direction of the fixed layer in the resistor elements of the sensing bridge X02 so as to differentiate a phase by the electric angle of 180 degrees. Thus, since the electric angle is doubled for removing the inductive noise, the dimensions of the chip much increase.

SUMMARY

In view of the above-described problem, it is an object of the present disclosure to provide a rotation angle detector including a magnet rotator having a pair of magnetic poles and a sensor chip with multiple magnetic field detection elements on a semiconductor substrate. The dimensions of the chip are improved without increasing the number of magnetic poles of the magnet rotator.

According to an aspect of the present disclosure, a rotation angle detector includes: a magnet rotator including at least one pair of magnetic poles, wherein the magnet rotator together with a magnet is mounted on a rotation shaft; a sensor chip including a semiconductor substrate and a magnetic field detection element in the semiconductor substrate, wherein the magnetic field detection element detects a magnetic field; and an operation element. The rotation shaft and the sensor chip are arranged in a magnetic field, which provides to rotate the rotation shaft. The rotation angle detector detects a rotation angle of the magnet rotator based on an electric signal output from the magnetic field detection element. The magnetic field detection element includes a first magnetic field detection element and a second magnetic field detection element, which are spaced apart from each other by a distance corresponding to a predetermined phase difference. The first magnetic field detection element includes a first normal component detection element for detecting a magnetic field along with a normal direction and a first rotation component detection element for detecting a magnetic field along with a rotation direction. The normal direction passes a center of the rotator and is perpendicular to the rotation direction. The second magnetic field detection element includes a second normal component detection element for detecting the magnetic field along with the normal direction and a second rotation component detection element for detecting the magnetic field along with the rotation direction. The phase difference satisfies a condition that a value obtained by dividing a difference between an output signal of the first normal component detection element and an output signal of the second normal component detection element with the phase difference is approximated to a value obtained by differentiating a component of the magnetic field along with the normal direction around the sensor chip with respect to the rotation direction, and a value obtained by dividing a difference between an output signal of the first rotation component detection element and an output signal of the second rotation component detection element with the phase difference is approximated to a value obtained by differentiating a component of the magnetic field along with the rotation direction with respect to the rotation direction. The phase difference is defined as $\Delta\theta$, the output signal of the first normal component detection element is defined as $S_1$, the output signal of the second normal component detection element is defined as $S_2$, the output signal of the first rotation component detection element is defined as $C_1$, the output signal of the second rotation component detection element is defined as $C_2$, a first term depending on the magnetic field for rotating the rotation shaft is defined as $\alpha$, and a second term depending on the magnetic field for rotating the rotation shaft is defined as $\beta$. The operation element calculates a value of:

$$C_1 + \alpha \frac{S_1 - S_2}{\Delta\theta}$$

and a value of:

$$S_1 - \beta \frac{C_1 - C_2}{\Delta\theta}.$$

The phase difference $\Delta\theta$ does not depend on the electric angle. The electric angle depends on the number of magnetic poles in the rotator. The phase difference $\Delta\theta$ can be a value such that a differential calculation can be approximated. Accordingly, even when the first magnetic field detection element and the second magnetic field detection element are formed in the semiconductor substrate, the dimensions of the sensor chip is restricted from increasing. Since the number of the magnetic poles of the rotator is not increased in order to reduce the electric angle, the frequency of the rotation magnetic field is restricted from increasing.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION

First Embodiment

Figure 1:
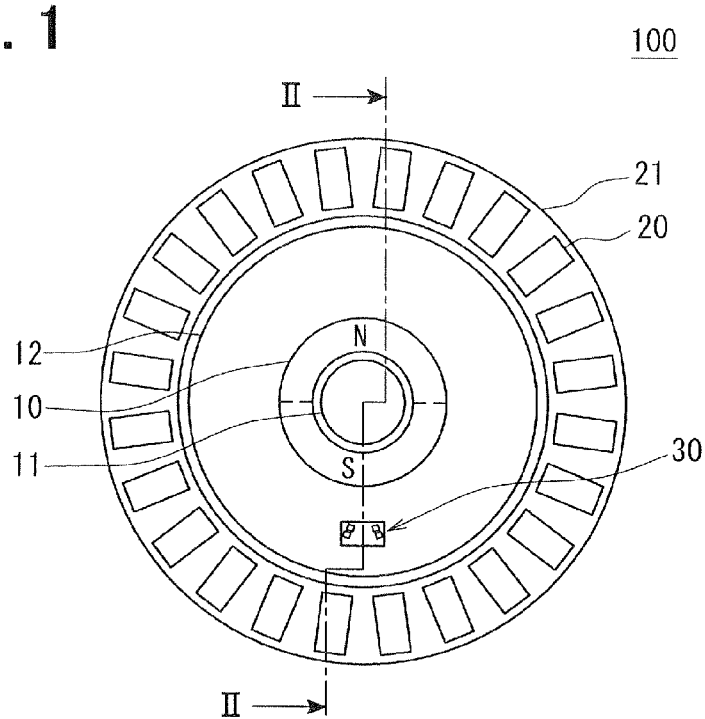
FIG. 1 is a diagram showing a plan view of a rotation angle detector according to a first embodiment.
Figure 2:
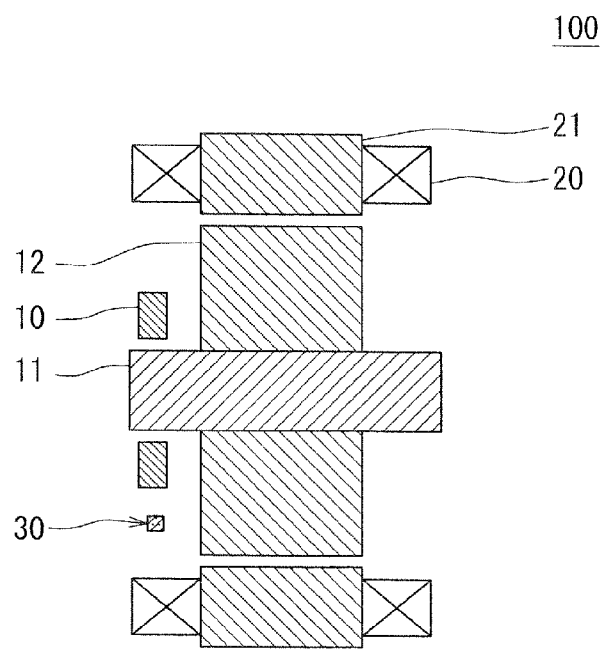
FIG. 2 is a diagram showing a cross sectional view of the detector taken along line II-II in FIG. 1.
Figure 3:
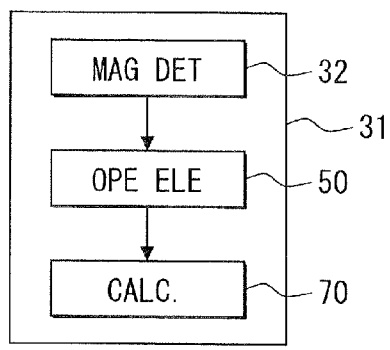
FIG. 3 is a block diagram showing electric connection between a magnetic field detection element, an operation element and a calculator.
Figure 4:
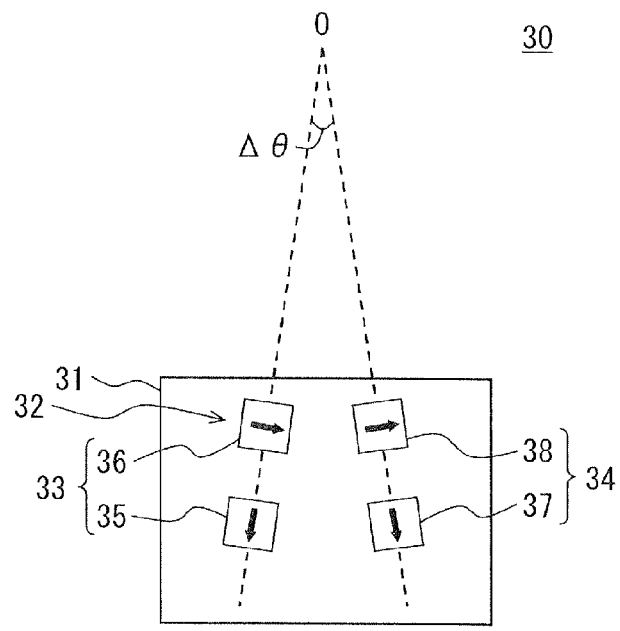
FIG. 4 is a diagram showing a plan view of a relationship between a sensor chip and a magnet rotator.

FIG. 1 shows a plan view of a rotation angle detector according to a first embodiment. FIG. 2 shows a cross sectional view of the detector taken along line II-II in FIG. 1. FIG. 3 shows electric connection between a magnetic field detection element, an operation element and a calculator. FIG. 4 shows a plan view of a relationship between a sensor chip and a magnet rotator. A rotating direction of a magnet rotator 10 is defined as a rotation direction. A direction along with a thickness of a semiconductor substrate 31 is defined as a thickness direction. A direction perpendicular to the thickness direction and the rotation direction and passing a center O of the magnet rotator is defined as a normal direction.

The detector 100 mainly includes the magnet rotator 10, a sensor chip 30, the operation element 50 and a calculator 70. As shown in FIGS. 1 and 2, a winding 20 for generating a magnetic field surrounds the rotator 10. The sensor chip 30 is arranged between the rotator 10 and the winding 20. Thus, the magnetic field generated by the rotator 10 and the magnetic field generated by the winding 20 are applied to the chip 30. Further, as shown in FIG. 3, the magnetic field detection element 32 of the sensor chip 30 is electrically coupled with the operation element 50. The operation element 50 is electrically coupled with the calculator 70. Thus, the electric signal detected by the magnetic field detection element 32 is input into the calculator 70 via the operation element 50.

As described later, the sensor chip 30 detects a change of the magnetic field of the rotator 10 so that the chip 30 executes a measuring function for measuring the rotation angle of the rotator 10. However, not only the magnetic flux of the magnet rotator 10 but also the magnetic flux of the winding 20 are applied to the chip 30. The magnetic flux of the winding 20 provides a noise when the rotation angle of the rotator 10 is detected. The detector 100 according to the present embodiment removes the noise as an inductive noise in an output signal from the chip 30 without increasing the dimensions of the chip 30. Here, the magnetic field corresponding to the magnetic flux generated by the winding 20 corresponds to the magnetic field for rotating the rotation shaft of the rotator 10.

As shown in FIGS. 1 and 2, the rotator 10 has a ring shape. The rotation shaft 11 having a column shape is inserted into a hole, which is formed by an inner wall of the rotator 10. Thus, the rotator 10 together with a rotor 12 made of permanent magnet is fixed to the shaft 11, which is mounted in a vehicle. The center O of the rotator 10 is positioned at the shaft 11. The rotator 10 includes a pair of magnetic poles composed of a S pole and a N pole. The rotor 12 includes two pairs of magnetic poles. The shaft 11 together with the rotator 10 is rotated by the repulsive force between the magnetic flux generated by the winding 20 and the magnetic flux generated by the rotor 12. Here, the shaft 11 provides a rotation axis. The rotor 12 provides a permanent magnet.

When the rotator 10 rotates, the rotation magnetic field along with a rotation direction is generated by the rotation and the magnetic flux of the rotator 10 around the chip 30. As described above, the shaft 11 (i.e., the rotator 10) is rotated by the repulsive force between the magnetic flux generated by the winding 20 and the magnetic flux generated by the rotor 12. Accordingly, the rotation direction of the magnetic field corresponding to the magnetic flux of the winding 20 is opposite to the rotation direction of the rotation magnetic field corresponding to the magnetic flux generated by the rotator 10. Here, in FIGS. 1 and 2, although the rotator 10 is spaced apart from the shaft 11, the rotator 10 is fixed to the shaft 11 with adhesive and the like. Further, in FIGS. 1 and 2, although the chip 30 is spaced apart from the shaft 11, the chip 30 is fixed to a frame, which accommodates the shaft 11 and the winding 20.

The winding 20 generates the magnetic field for rotating the shaft 11. The winding 20 includes multiple coils as a winding element, which are fixed to the stator 21. Current flows in each coil so that a magnetic field is generated. one magnetic pole of the rotor 12 corresponds to six coils 20. Twenty-four coils 20 of the wining 20 are fixed to the stator 21.

The sensor chip 30 includes a semiconductor substrate 31 and the magnetic field detection element 32, which is formed in the substrate 31. The magnetic field detection element 32 includes a first magnetic field detection element 33 and a second magnetic field detection element 34, which are separated from each other by a phase difference of $\Delta\theta$ in the rotation direction of the rotator 10. The first magnetic field detection element 33 includes a first normal component detection element 35 for detecting the magnetic field along with the normal line and a first rotation component detection element 36 for detecting the magnetic field along with the rotation direction. The second magnetic field detection element 34 includes a second normal component detection element 37 for detecting the magnetic field along with the normal line and a second rotation component detection element 38 for detecting the magnetic field along with the rotation direction.

As shown in FIG. 4, the first normal component detection element 35 and the first rotation component detection element 36 are spaced apart from each other by a predetermined distance in the normal direction. The second normal component detection element 37 and the second rotation component detection element 38 are spaced apart from each other by a predetermined distance in the normal direction. The first normal component detection element 35 and the second normal component detection element 37 are arranged to be spaced a part from the center O by an equal distance. The first rotation component detection element 36 and the second rotation component detection element 38 are arranged to be spaced a part from the center O by another equal distance.

The first and second normal component detection elements 35, 37 and the first and second rotation component detection elements 36, 38 as a component detection element are magneto-electric transducers for converting a magnetic signal to an electric signal. Each of the detection elements 35-38 is a magneto-resistance sensor having a fixed layer and a variable layer. The magnetization direction of the fixed layer is fixed. The magnetization direction of the variable layer is changed according to the magnetic field direction. An arrow in FIG. 4 shows the magnetization direction of the fixed layer. The magnetization direction of the fixed layer in the first and second normal component detection elements 35, 37 is arranged along with the normal direction. The magnetization direction of the fixed layer in the first and second rotation component detection elements 36, 38 is arranged along with the rotation direction. More specifically, the magnetization direction of the fixed layer in the first and second rotation component detection elements 36, 38 is arranged along with a tangential direction of the rotation direction. The magnetization direction of the fixed layer in the first and second normal component detection elements 35, 37 directs to a direction moving away from the center O. The magnetization direction of the fixed layer in the first and second rotation component detection elements 36, 38 directs to a counter-clockwise direction around the center O.

The above magneto-resistance sensor has a property such that a resistance of the sensor is changed according to an angle between the magnetization direction of the fixed layer and the magnetization direction of the variable layer. Accordingly, when the rotator 10 rotates by the electric angle, which is defined by dividing the rotation angle with the number of pairs of the magnetic poles, the sensor chip 30 outputs a signal corresponding to one period waveform. The rotator 10 has one pair of magnetic poles, and therefore, the sensor chip 30 outputs the signal corresponding to one period waveform when the rotator 10 rotates one revolution.

The operation element 50 is electrically coupled with the sensor chip 30. The operation element 50 removes the magnetic flux (i.e., the inductive noise) of the winding 20 from each output signal $S_1$, $S_2$, $C_1$, $C_2$ based on the output signals $S_1$, $S_2$ of the first and second normal component detection elements 35, 37 and the output signals $C_1$, $C_2$ of the first and second rotation component detection elements 36, 38. On the other hand, the calculator 70 is electrically coupled with the operation element 50. Based on the output signal from the operation element 50, the calculator 70 performs a calculation function of the rotation angle θ of the rotator 10. As shown in FIG. 3, the operation element 50 and the calculator 70 together with the magnetic field detection element 32 are formed in the semiconductor substrate 31.

The characteristics of the rotation angle detector 100 will be explained as follows. The first magnetic field detection element 33 and the second magnetic field detection element 34 are spaced apart from each other by a distance corresponding to the phase difference of Δθ in the rotation direction of the rotator 10. Specifically, as shown in FIG. 4, first and second normal component detection elements 35, 37 are spaced apart from each other by a distance corresponding to the phase difference of Δθ. The first and second rotation component detection elements 36, 38 are spaced apart from each other by a distance corresponding to the phase difference of Δθ. A value obtained by dividing the difference between the output signal $S_1$ and the output signal $S_2$ with the phase difference of Δθ is approximated to a value $\Delta_\theta b_R$, which is obtained by differentiating a component $b_R$ of the magnetic field B along with the normal direction around the sensor chip 30 with respect to the rotation direction. A value obtained by dividing the difference between the output signal C1 and the output signal $C_2$ with the phase difference of Δθ is approximated to a value $\Delta_\theta b_\theta$, which is obtained by differentiating a component $b_\theta$ of the magnetic field B along with the rotation direction with respect to the rotation direction. Thus, the following equations are satisfied.

$$\frac{S_1 - S_2}{\Delta \theta} \cong \Delta_\theta b_R \quad \text{(F1)}$$

$$\frac{C_1 - C_2}{\Delta \theta} \cong \Delta_\theta b_\theta \quad \text{(F2)}$$

Further, based on the following calculations, the inductive noise is removed. When the operation element calculates the angle θ, the following calculations are performed.

$$C_1 + \alpha \frac{S_1 - S_2}{\Delta \theta} \quad \text{(F3)}$$

$$S_1 - \beta \frac{C_1 - C_2}{\Delta \theta} \quad \text{(F4)}$$

The terms α, β in the above equations depend on a ratio γ between an amplitude of the normal line component of the magnetic flux (i.e., the inductive noise) generated by the winding 20 and the amplitude of the rotation component of the magnetic flux. The operation element 50 is electrically coupled with a circuit (not shown) for flowing current to the winding 20. The operation element 50 includes a detector for detecting current flowing through the winding 20. The operation element 50 further includes a memory for storing the information of a relation ship between the current flowing through the winding 20 and the ratio γ corresponding to the current. After the operation element 50 detects the current flowing through the winding 20, the operation element 50 reads out the ratio γ corresponding to the current from the memory. Then, the operation element 50 calculates the equations F3 and F4.

Next, in order to explain the functions and the effects of the detector 100 according to the present embodiment, the calculation method of the magnetic field generated around the sensor chip 30 and the calculation method of removing the magnetic flux (i.e., the inductive noise) of the winding 20 in the magnetic field will be explained.

As described above, the rotation direction of the magnetic field corresponding to the magnetic flux of the winding 20 is opposite to the rotation direction of the rotation magnetic field corresponding to the magnetic flux of the rotator 10. Thus, the magnetic field generated by the winding 20 is defined as $B_N$, and the amplitude of the component of the magnetic field $B_N$ along with the rotation direction is defined as $B_{N\theta}$. The amplitude of the component of the magnetic field $B_N$ along with the normal direction is defined as $B_{NR}$. The number of the pairs of the magnetic poles in the rotor 12 is defined as $N_N$. The rotation magnetic field generated by the rotator 10 is defined as $B_S$. The amplitude of the component of the magnetic field $B_S$ along with the rotation direction is defined as $B_{S\theta}$. The amplitude of the component of the magnetic field $B_S$ along with the normal direction is defined as $B_{SR}$. The number of the pairs of the magnetic poles in the rotator 10 is defined as $N_S$. An angle in the rotation direction is defined as θ. The following equations are satisfied.

$$B_N = (B_{N\theta} \cos(-N_N \theta), B_{NR} \sin(-N_N \theta)) \quad \text{(F5)}$$

$$B_S = (B_{S\theta} \cos(N_S \theta), B_{SR} \sin(N_S \theta)) \quad \text{(F6)}$$

Here, as described above, since the rotor 12 includes two pairs of the magnetic poles, the number of the pairs of the magnetic poles in the rotor 12 $N_N$ is two (i.e., $N_N=2$). Since the rotator 10 includes one pair of the magnetic poles, the number of the pairs of the magnetic poles in the rotator 10 $N_S$ is one (i.e., $N_S=1$). Based on the equations F5 and F6, the magnetic field B generated around the sensor chip 30 is calculated by the following equation F7.

$$B = B_N + B_S = (b_\theta, b_R) = (B_{N\theta} \cos(-N_N \theta) + B_{S\theta} \cos(N_S \theta), B_{NR} \sin(-N_N \theta) + B_{SR} \sin(N_S \theta)) \quad \text{(F7)}$$

Thus, the fine change amount of the magnetic field B in the rotation direction, i.e., the differential value of the magnetic field B in the rotation direction, is obtained by the following equation F8.

$$\frac{dB}{d\theta} = (\Delta_\theta b_\theta, \Delta_\theta b_R) = (B_{N\theta}N_N\sin(-N_N\theta) - B_{S\theta}N_S\sin(N_S\theta), \quad \text{(F8)}$$
$$-B_{NR}N_N\cos(-N_N\theta) + B_{SR}N_S\cos(N_S\theta))$$

Thus, the component $b_\theta$ of the magnetic field B along with the rotation direction and the value $\Delta_\theta b_R$ depend on the value of cos θ. The component $b_R$ of the magnetic field B along with the normal direction and the value $\Delta_\theta b_\theta$ depend on the value of sin θ. Accordingly, in order to remove the inductive noise, the following equations are calculated with using the terms α, β.

$$b_\theta + \alpha\Delta_\theta b_R = B_{N\theta}\cos(-N_N\theta) + B_{S\theta}\cos(N_S\theta) - \alpha B_{NR}N_N \cos(-N_N\theta) + \alpha B_{SR}N_S\cos(N_S\theta) \quad \text{(F9)}$$

$$b_R - \beta\Delta_\theta b_\theta = B_{NR}\sin(-N_N\theta) + B_{SR}\sin(N_S\theta) - \beta B_{N\theta}N_N\sin(-N_N\theta) + \beta B_{S\theta}N_S\sin(N_S\theta) \quad \text{(F10)}$$

A term including the amplitude $B_{N\theta}$ of the component of the magnetic field $B_N$ along with the rotation direction and another term including the amplitude $B_{NR}$ of the component of the magnetic field $B_N$ along with the normal direction in the equations F9 and F10 provide the inductive noise. In order to remove the inductive noise, the terms α, β should be satisfied with the following equations.

$$\alpha = \frac{B_{N\theta}}{B_{NR}} \cdot \frac{1}{N_N} \quad \text{(F11)}$$

$$\beta = \frac{B_{NR}}{B_{N\theta}} \cdot \frac{1}{N_N} \quad \text{(F12)}$$

When the terms α, β obtained from the equations F11 and F12 are substituted into the equations F9 and F10, the following equations are obtained.

$$\left(B_{S\theta} + \frac{B_{N\theta}}{B_{NR}} \cdot \frac{N_S}{N_N} \cdot B_{SR}\right)\cos(N_S\theta) \quad \text{(F13)}$$

$$\left(B_{SR} + \frac{B_{NR}}{B_{N\theta}} \cdot \frac{N_S}{N_N} \cdot B_{S\theta}\right)\sin(N_S\theta) \quad \text{(F14)}$$

Thus, when the component $b_\theta$, the component $b_R$, the value $\Delta_\theta b_\theta$, the value $\Delta_\theta b_R$ and the terms α, β are given, the terms of $\cos(N_S\theta)$ and $\sin(N_S\theta)$, in each detection signal, from which the inductive noise is cancelled, are obtained.

Based on the above, the functions and the effects of the detector 100 will be explained. In the detector 100, the equations F1 and F2 are satisfied.

The output signals $S_1$, $S_2$ of the first and second normal component detection elements 35, 37 are in proportion to the component $b_R$ of the magnetic field B along with the normal direction. The output signals $C_1$, $C_2$ of the first and second rotation component detection elements 36, 38 are in proportion to the component $b_\theta$ of the magnetic field B along with the rotation direction. Thus, the following equations are satisfied.

$$S_1 \propto b_R \quad \text{(F15)}$$

$$C_1 \propto b_\theta \quad \text{(F16)}$$

Thus, the following equations are satisfied.

$$b_\theta + \alpha\Delta_\theta b_R \cong C_1 + \alpha\frac{S_1 - S_2}{\Delta\theta} \quad \text{(F17)}$$

$$b_R - \beta\Delta_\theta b_\theta \cong S_1 - \beta\frac{C_1 - C_2}{\Delta\theta} \quad \text{(F18)}$$

Accordingly, the right side of each of the equations F17 and F18, i.e., the equations F3 and F4, are calculated by the operation element 50, so that the terms of $\cos(N_S\theta)$ and $\sin(N_S\theta)$ shown in the equations F13 and F14, from which the inductive noise is cancelled, are obtained. After the signals corresponding to the terms of $\cos(N_S\theta)$ and $\sin(N_S\theta)$ are obtained, the calculator 70 performs calculation with using an arctangent function or a tracking calculation, so that the angle θ is obtained. Here, the tracking calculation is as follows. An angle is defined as φ, and a difference between a value obtained by multiplying the obtained term of $\sin(N_S\theta)$ with the term of cos φ and a value obtained by multiplying the obtained term of $\cos(N_S\theta)$ with the term of sin φ is calculated so that the term of $\sin(N_S\theta-\phi)$ is calculated. Then, the angle φ is varied until the term of $\sin(N_S\theta-\phi)$ is equal to or smaller than a predetermined fine amount, i.e., an error range. Thus, this loop calculation is executed so that the angle φ approaches the angle θ. Finally, the angle θ is obtained.

The terms α, β are expressed by the ratio γ between the amplitude $B_{N\theta}$ of the component of the magnetic field $B_N$ and the amplitude $B_{NR}$ of the component of the magnetic field $B_N$ and the number $N_N$ of the pairs of the magnetic poles in the rotor 12, as described in the equations F11 and F12. In the present embodiment, the number $N_N$ of the pairs of the magnetic poles is two, and the ratio γ is detected by the operation element 50. Thus, each parameter in the equations F11 and F12 is detected or obtained, so that the equations F11 and F12 can be calculated.

As described above, the phase difference Δθ does not depend on the electric angle. The electric angle depends on the number of magnetic poles in the rotor 10. The phase difference Δθ can be a value such that a differential calculation can be approximated. Accordingly, even when the first magnetic field detection element 33 and the second magnetic field detection element 34 are formed in the semiconductor substrate 31, the dimensions of the sensor chip 30 is restricted from increasing. Since the number of the magnetic poles of the rotator 10 is not increased in order to reduce the electric angle, the frequency of the rotation magnetic field is restricted from increasing.

The operation element 50 and the calculator 70 together with the magnetic field detection element 32 are formed in the semiconductor substrate 31. In this case, the dimensions of the detector 100 are restricted from increasing, compared with a case where at least one of the operation element 50 and the calculator 70 is formed in another semiconductor substrate, which is different from the semiconductor substrate 31, in which the magnetic field detection element 32 is formed.

In the present embodiment, the rotator 10 includes one pair of the magnetic poles. In this case, the rotation frequency of the rotation magnetic field is restricted from increasing, so that a difficulty that the processing speed of the operation element 50 is not sufficient to process the input signal is improved.

In the present embodiment, the shaft 11 and the winding 20 are accommodated in the frame (not shown), and the sensor chip 30 is fixed to the frame. In this case, the structure of the detector is simplified, compared with a case where the sensor chip 30 is fixed to a member different from the frame.

In the present embodiment, each component detection element 35-38 is the magneto-resistance effect element having the fixed layer and the variable layer. The magnetization direction of the fixed layer is fixed to a certain direction. The magnetization direction of the variable layer is varied with the direction of the magnetic field. Alternatively, each component detection element 35-38 may be a magneto-electric transducer for converting a magnetic signal to an electric signal, and the component detection element 35-38 is not limited to the magneto-resistance effect element. The magneto-electric transducer may be a magneto-resistance sensor, of which the change of the resistance caused by the magnetic flux depends on the shape of the sensor. Alternatively, the magneto-electric transducer may be a vertical Hall element, in which the current flows in the thickness direction of the semiconductor substrate. The magneto-resistance sensor is a tunnel type magneto-resistance sensor or a giant magneto-resistance effect element.

In the present embodiment, the rotator 10 includes only one pair of the magnetic poles composed of the S pole and the N pole. Alternatively, the rotator 10 may include two or more pairs of the magnetic poles. For example, the rotator 10 may include three pairs of the magnetic poles.

In the present embodiment, the rotor 12 includes two pairs of the magnetic poles composed of the S pole and the N pole. Alternatively, the rotor 12 may include three or more pairs of the magnetic poles. For example, the rotor 12 may include four pairs of the magnetic poles. In this case, forty-eight winding elements 20 are fixed to the stator 21.

Figure 5:
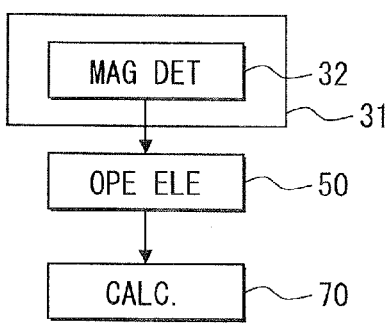
FIG. 5 is a block diagram showing another electric connection between a magnetic field detection element, an operation element and a calculator.
Figure 6:
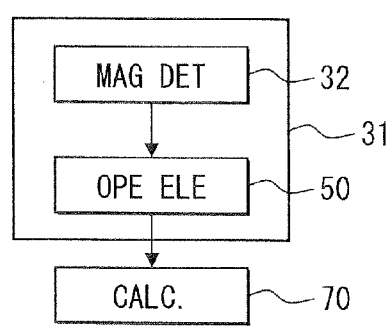
FIG. 6 is a block diagram showing further another electric connection between a magnetic field detection element, an operation element and a calculator.

In the present embodiment, as shown in FIG. 3, the operation element 50 and the calculator 70 together with the magnetic field detection element 32 are formed in the semiconductor substrate 31. Alternatively, for example, as shown in FIG. 5, both of the operation element 50 and the calculator 70 may not be formed in the semiconductor substrate 31. Alternatively, only the operation element 50 together with the magnetic field detection element 32 may be formed in the semiconductor substrate 31. Alternatively, the calculator 70 together with the magnetic field detection element 32 may be formed in the semiconductor substrate 31. In these cases, the dimensions of the detector 100 increases, compared with a case where the operation element 50 and the calculator 70 together with the magnetic field detection element 32 are formed in the semiconductor substrate 31. FIGS. 5 and 6 are block diagrams showing electric connection between the operation element 50, the calculator 70 and the magnetic field detection element 32.

In the present embodiment, the first normal component detection element 35 and the first rotation component detection element 36 are spaced apart from each other by a predetermined distance in the normal direction. The second normal component detection element 37 and the second rotation component detection element 38 are spaced apart from each other by a predetermined distance in the normal direction. Alternatively, the first normal component detection element 35 and the second normal component detection element 37 may be arranged to be spaced a part from the center O by an equal distance. The first rotation component detection element 36 and the second rotation component detection element 38 may be arranged to be spaced a part from the center O by another equal distance. For example, the first and second normal component detection elements 35, 37 and the first and second rotation component detection elements 36, 38 may be arranged to be spaced a part from the center O by an equal distance.

In the present embodiment, the magnetization direction of the fixed layer in each of the first and second normal component detection elements 35, 37 directs to a direction moving away from the center O. The magnetization direction of the fixed layer in the first and second rotation component detection elements 36, 38 directs to a counter-clockwise direction around the center O. Alternatively, the magnetization direction of the fixed layer in each of the first and second normal component detection elements 35, 37 may direct to a direct approaching the center O. The magnetization direction of the fixed layer in the first and second rotation component detection elements 36, 38 may direct to a clockwise direction around the center O.

Alternatively, the magnetization direction of the fixed layer in the first normal component detection element 35 may direct to a direction moving away from the center O, and the magnetization direction of the fixed layer in the second normal component detection element 37 may direct to a direction approaching the center O. The magnetization direction of the fixed layer in the first rotation component detection element 36 may direct to a counter-clockwise direction around the center O, and the magnetization direction of the fixed layer in the second rotation component detection element 38 may direct to a clockwise direction around the center O. In this case, a sum of the output signal $S_1$ of the first normal component detection element 35 and the output signal $S_2$ of the second normal component detection element 37 corresponds to the difference between the output signal $S_1$ of the first normal component detection element 35 and the output signal $S_2$ of the second normal component detection element 37 in the above equations. Thus, the term of $S_1+S_2$ corresponds to the term $S_1-S_2$ in the above equations. A sum of the output signal $C_1$ of the first rotation component detection element 36 and the output signal $C_2$ of the second rotation component detection element 38 corresponds to the difference between the output signal $C_1$ of the first rotation component detection element 36 and the output signal $C_2$ of the second rotation component detection element 38 in the above equations. Thus, the term of $C_1+C_2$ corresponds to the term $C_1-C_2$ in the above equations.

The above disclosure has the following aspects.

According to an aspect of the present disclosure, a rotation angle detector includes: a magnet rotator including at least one pair of magnetic poles, wherein the magnet rotator together with a magnet is mounted on a rotation shaft; a sensor chip including a semiconductor substrate and a magnetic field detection element in the semiconductor substrate, wherein the magnetic field detection element detects a magnetic field; and an operation element. The rotation shaft and the sensor chip are arranged in a magnetic field, which provides to rotate the rotation shaft. The rotation angle detector detects a rotation angle of the magnet rotator based on an electric signal output from the magnetic field detection element. The magnetic field detection element includes a first magnetic field detection element and a second magnetic field detection element, which are spaced apart from each other by a distance corresponding to a predetermined phase difference. The first magnetic field detection element includes a first normal component detection element for detecting a magnetic field along with a normal direction and a first rotation component detection element for detecting a magnetic field along with a rotation direction. The normal direction passes a center of the rotator and is perpendicular to the rotation direction. The second magnetic field detection element includes a second normal component detection element for detecting the magnetic field along with the normal direction and a second rotation component detection element for detecting the magnetic field along with the rotation direction. The phase difference satisfies a condition that a value obtained by dividing a difference between an output signal of the first normal component detection element and an output signal of the second normal component detection element with the phase difference is approximated to a value obtained by differentiating a component of the magnetic field along with the normal direction around the sensor chip with respect to the rotation direction, and a value obtained by dividing a difference between an output signal of the first rotation component detection element and an output signal of the second rotation component detection element with the phase difference is approximated to a value obtained by differentiating a component of the magnetic field along with the rotation direction with respect to the rotation direction. The phase difference is defined as $\Delta\theta$, the output signal of the first normal component detection element is defined as $S_1$, the output signal of the second normal component detection element is defined as $S_2$, the output signal of the first rotation component detection element is defined as $C_1$, the output signal of the second rotation component detection element is defined as $C_2$, a first term depending on the magnetic field for rotating the rotation shaft is defined as $\alpha$, and a second term depending on the magnetic field for rotating the rotation shaft is defined as $\beta$. The operation element calculates a value of:

$$C_1 + \alpha \frac{S_1 - S_2}{\Delta\theta}$$

and a value of:

$$S_1 - \beta \frac{C_1 - C_2}{\Delta\theta}.$$

The phase difference $\Delta\theta$ does not depend on the electric angle. The electric angle depends on the number of magnetic poles in the rotator. The phase difference $\Delta\theta$ can be a value such that a differential calculation can be approximated. Accordingly, even when the first magnetic field detection element and the second magnetic field detection element are formed in the semiconductor substrate, the dimensions of the sensor chip is restricted from increasing. Since the number of the magnetic poles of the rotator is not increased in order to reduce the electric angle, the frequency of the rotation magnetic field is restricted from increasing.

Alternatively, the operation element may be disposed in the semiconductor substrate. In this case, the dimensions of the detector are reduced.

Alternatively, the rotation angle detector may further include: a calculator for calculating the rotation angle of the magnet rotator based on the values output from the operation element. After the operation element calculates the value of $\cos(N_S\theta)$ and the value of $\sin(N_S\theta)$, the signals corresponding to the values are input into the calculator so that the calculator calculates the rotation angle of the magnet rotator.

Alternatively, the calculator may be disposed in the semiconductor substrate. In this case, the dimensions of the detector are reduced.

Alternatively, the magnet rotator may include only one pair of magnetic poles. In this case, the rotation frequency of the rotation magnetic field is restricted from increasing. Thus, a difficulty that the processing speed of the operation element 50 is not sufficient to process the input signal is improved.

Alternatively, each of the first normal component detection element, the second normal component detection element, the first rotation component detection element and the second rotation component detection element may be a magneto-resistance sensor. The magneto-resistance sensor includes a fixed layer and a variable layer. The fixed layer has a fixed magnetization direction fixed to a predetermined direction. The variable layer has a variable magnetization direction varied with a direction of the magnetic field. Further, the magneto-resistance sensor may be a tunnel magneto-resistance sensor. Furthermore, the fixed magnetization direction of the fixed layer in each of the first and second normal component detection elements may direct to a direction moving away from the center of the magnet rotator, and the fixed magnetization direction of the fixed layer in each of the first and second rotation component detection elements may direct to one direction around the center of the magnet rotator.

Alternatively, the fixed magnetization direction of the fixed layer in each of the first and second normal component detection elements may direct to a direction approaching the center of the magnet rotator, and the fixed magnetization direction of the fixed layer in each of the first and second rotation component detection elements may direct to one direction around the center of the magnet rotator.

Alternatively, the first normal component detection element and the first rotation component detection element may be arranged to be spaced apart from each other by a predetermined distance in the normal direction, and the second normal component detection element and the second rotation component detection element may be arranged to be spaced apart from each other by the predetermined distance in the normal direction.

Alternatively, the first and second normal component detection elements and the first and second rotation component detection elements may be arranged to be spaced a part from the center of the magnet rotator by an equal distance.

Alternatively, the rotation shaft may be a shaft of a vehicle.

Alternatively, the rotation shaft may be accommodated in a frame, and the sensor chip may be fixed to the frame.

Alternatively, the rotation angle detector may further include: a winding for generating a magnetic field, which provides to rotate the rotation shaft. The winding surrounds the rotator. The sensor chip is disposed between the winding and the rotator. The magnet rotator includes only one pair of magnetic poles. The magnet includes two pairs of magnetic poles.

Alternatively, the number of pairs of the magnet is defined as $N_N$. An amplitude of a component of the magnetic field generated by the winding along with the rotation direction is defined as $B_{N\theta}$, and an amplitude of a component of the magnetic field generated by the winding along with the normal direction is defined as $B_{NR}$. The first term of a satisfies an equation of:

$$\alpha = \frac{B_{N\theta}}{B_{NR}} \cdot \frac{1}{N_N}$$

The second term of $\beta$ satisfies an equation of:

$$\beta = \frac{B_{NR}}{B_{N\theta}} \cdot \frac{1}{N_N}$$

Alternatively, the rotation angle detector may further include: a calculator for calculating the rotation angle of the magnet rotator based on the values output from the operation element. The operation element and the calculator are disposed in the semiconductor substrate. Each of the first normal component detection element, the second normal component detection element, the first rotation component detection element and the second rotation component detection element is a tunnel magneto-resistance sensor. The tunnel magneto-resistance sensor includes a fixed layer and a variable layer. The fixed layer has a fixed magnetization direction fixed to a predetermined direction. The variable layer has a variable magnetization direction varied with a direction of the magnetic field. The fixed magnetization direction of the fixed layer in each of the first and second normal component detection elements directs to a direction moving away from the center of the magnet rotator. The fixed magnetization direction of the fixed layer in each of the first and second rotation component detection elements directs to one direction around the center of the magnet rotator.

Alternatively, the first and second normal component detection elements may be arranged to be spaced a part from the center of the magnet rotator by an equal distance. The first and second rotation component detection elements may be arranged to be spaced a part from the center of the magnet rotator by another equal distance.

Alternatively, the first normal component detection element and the first rotation component detection element may be disposed on a normal line of the magnet rotator, and the second normal component detection element and the second rotation component detection element may be disposed on another normal line of the magnet rotator.

While the invention has been described with reference to preferred embodiments thereof, it is to be understood that the invention is not limited to the preferred embodiments and constructions. The invention is intended to cover various modification and equivalent arrangements. In addition, while the various combinations and configurations, which are preferred, other combinations and configurations, including more, less or only a single element, are also within the spirit and scope of the invention.

What is claimed is:

1. A rotation angle detector comprising:
    a magnet rotator including at least one pair of magnetic poles, wherein the magnet rotator together with a magnet is mounted on a rotation shaft;
    a sensor chip including a semiconductor substrate and a magnetic field detection element in the semiconductor substrate, wherein the magnetic field detection element detects a magnetic field; and
    an operation element,
    wherein the rotation shaft and the sensor chip are arranged in a magnetic field, which provides to rotate the rotation shaft,
    wherein the rotation angle detector detects a rotation angle of the magnet rotator based on an electric signal output from the magnetic field detection element,
    wherein the magnetic field detection element includes a first magnetic field detection element and a second magnetic field detection element, which are spaced apart from each other by a distance corresponding to a predetermined phase difference,
    wherein the first magnetic field detection element includes a first normal component detection element for detecting a magnetic field along with a normal direction and a first rotation component detection element for detecting a magnetic field along with a rotation direction,
    wherein the normal direction passes a center of the rotator and is perpendicular to the rotation direction,
    wherein the second magnetic field detection element includes a second normal component detection element for detecting the magnetic field along with the normal direction and a second rotation component detection element for detecting the magnetic field along with the rotation direction,
    wherein the phase difference satisfies a condition that a value obtained by dividing a difference between an output signal of the first normal component detection element and an output signal of the second normal component detection element with the phase difference is approximated to a value obtained by differentiating a component of the magnetic field along with the normal direction around the sensor chip with respect to the rotation direction, and a value obtained by dividing a difference between an output signal of the first rotation component detection element and an output signal of the second rotation component detection element with the phase difference is approximated to a value obtained by differentiating a component of the magnetic field along with the rotation direction with respect to the rotation direction,
    wherein the phase difference is defined as $\Delta\theta$, the output signal of the first normal component detection element is defined as $S_1$, the output signal of the second normal component detection element is defined as $S_2$, the output signal of the first rotation component detection element is defined as $C_1$, the output signal of the second rotation component detection element is defined as $C_2$, a first term depending on the magnetic field for rotating the rotation shaft is defined as $\alpha$, and a second term depending on the magnetic field for rotating the rotation shaft is defined as $\beta$,
    wherein the operation element calculates a value of:

$$C_1 + \alpha \frac{S_1 - S_2}{\Delta\theta}$$

and a value of:

$$S_1 - \beta \frac{C_1 - C_2}{\Delta\theta}.$$

2. The rotation angle detector according to claim 1, wherein the operation element is disposed in the semiconductor substrate.

3. The rotation angle detector according to claim 1, further comprising:
    a calculator for calculating the rotation angle of the magnet rotator based on the values output from the operation element.

4. The rotation angle detector according to claim 3, wherein the calculator is disposed in the semiconductor substrate.

5. The rotation angle detector according to claim 1, wherein the magnet rotator includes only one pair of magnetic poles.

6. The rotation angle detector according to claim 1, wherein each of the first normal component detection element, the second normal component detection element, the first rotation component detection element and the second rotation component detection element is a magneto-resistance sensor,
    wherein the magneto-resistance sensor includes a fixed layer and a variable layer,
    wherein the fixed layer has a fixed magnetization direction fixed to a predetermined direction, and wherein the variable layer has a variable magnetization direction varied with a direction of the magnetic field.

7. The rotation angle detector according to claim 6, wherein the magneto-resistance sensor is a tunnel magneto-resistance sensor.

8. The rotation angle detector according to claim 7, wherein the fixed magnetization direction of the fixed layer in each of the first and second normal component detection elements directs to a direction moving away from the center of the magnet rotator, and
wherein the fixed magnetization direction of the fixed layer in each of the first and second rotation component detection elements directs to one direction around the center of the magnet rotator.

9. The rotation angle detector according to claim 7, wherein the fixed magnetization direction of the fixed layer in each of the first and second normal component detection elements directs to a direction approaching the center of the magnet rotator, and
wherein the fixed magnetization direction of the fixed layer in each of the first and second rotation component detection elements directs to one direction around the center of the magnet rotator.

10. The rotation angle detector according to claim 1, wherein the first normal component detection element and the first rotation component detection element are arranged to be spaced apart from each other by a predetermined distance in the normal direction, and
wherein the second normal component detection element and the second rotation component detection element are arranged to be spaced apart from each other by the predetermined distance in the normal direction.

11. The rotation angle detector according to claim 1, wherein first and second normal component detection elements and the first and second rotation component detection elements are arranged to be spaced a part from the center of the magnet rotator by an equal distance.

12. The rotation angle detector according to claim 1, wherein the rotation shaft is a shaft of a vehicle.

13. The rotation angle detector according to claim 1, wherein the rotation shaft is accommodated in a frame, and wherein the sensor chip is fixed to the frame.

14. The rotation angle detector according to claim 1, further comprising:
a winding for generating a magnetic field, which provides to rotate the rotation shaft,
wherein the winding surrounds the rotator,
wherein the sensor chip is disposed between the winding and the rotator,
wherein the magnet rotator includes only one pair of magnetic poles, and
wherein the magnet includes two pairs of magnetic poles.

15. The rotation angle detector according to claim 14, wherein the number of pairs of the magnet is defined as $N_N$,
wherein an amplitude of a component of the magnetic field generated by the winding along with the rotation direction is defined as $B_{N\theta}$, and an amplitude of a component of the magnetic field generated by the winding along with the normal direction is defined as $B_{NR}$,
wherein the first term of α satisfies an equation of:

$$\alpha = \frac{B_{N\theta}}{B_{NR}} \cdot \frac{1}{N_N}$$

wherein the second term of β satisfies an equation of:

$$\beta = \frac{B_{NR}}{B_{N\theta}} \cdot \frac{1}{N_N}.$$

16. The rotation angle detector according to claim 15, further comprising:
a calculator for calculating the rotation angle of the magnet rotator based on the values output from the operation element,
wherein the operation element and the calculator are disposed in the semiconductor substrate,
wherein each of the first normal component detection element, the second normal component detection element, the first rotation component detection element and the second rotation component detection element is a tunnel magneto-resistance sensor,
wherein the tunnel magneto-resistance sensor includes a fixed layer and a variable layer,
wherein the fixed layer has a fixed magnetization direction fixed to a predetermined direction,
wherein the variable layer has a variable magnetization direction varied with a direction of the magnetic field,
wherein the fixed magnetization direction of the fixed layer in each of the first and second normal component detection elements directs to a direction moving away from the center of the magnet rotator, and
wherein the fixed magnetization direction of the fixed layer in each of the first and second rotation component detection elements directs to one direction around the center of the magnet rotator.

17. The rotation angle detector according to claim 16, wherein the first and second normal component detection elements are arranged to be spaced a part from the center of the magnet rotator by an equal distance, and
wherein the first and second rotation component detection elements are arranged to be spaced a part from the center of the magnet rotator by another equal distance.

18. The rotation angle detector according to claim 17, wherein the first normal component detection element and the first rotation component detection element are disposed on a normal line of the magnet rotator, and
wherein the second normal component detection element and the second rotation component detection element are disposed on another normal line of the magnet rotator.

* * * * *